(12) United States Patent
Smitsdorff et al.

(10) Patent No.: US 12,728,710 B2
(45) Date of Patent: Sep. 8, 2026

(54) CARGO-TRUCK ENCLOSURE SYSTEM

(71) Applicant: Kinedyne LLC, Prattville, AL (US)

(72) Inventors: Eric Smitsdorff, Prattville, AL (US); Chann A. Shangle, Deatsville, AL (US); Jason S. Lueck, Prattville, AL (US)

(73) Assignee: Kinedyne LLC, Prattville, AL (US)

( * ) Notice: Subject to any disclaimer, the term of this patent is extended or adjusted under 35 U.S.C. 154(b) by 332 days.

(21) Appl. No.: 18/609,482

(22) Filed: Mar. 19, 2024

(65) Prior Publication Data

US 2024/0317032 A1 Sep. 26, 2024

Related U.S. Application Data

(60) Provisional application No. 63/453,347, filed on Mar. 20, 2023.

(51) Int. Cl.
*B60J 5/06* (2006.01)
*B60P 7/08* (2006.01)
*B62D 33/04* (2006.01)

(52) U.S. Cl.
CPC ............. *B60J 5/065* (2013.01); *B60P 7/0815* (2013.01); *B62D 33/04* (2013.01)

(58) Field of Classification Search
CPC ......... B60J 5/065; B60P 7/0815; B62D 33/04
USPC .................. 410/104, 106, 110, 116, 115, 50; 296/186.2, 186.1, 186.4, 138, 155
See application file for complete search history.

(56) References Cited

U.S. PATENT DOCUMENTS 6,402,446 B1 * 6/2002 Nadherny ............. B60P 7/0815 410/100
7,942,472 B2 * 5/2011 Whitehead ............... B60J 5/065 296/186.1
9,051,774 B1 * 6/2015 Acker, Jr. ................ A47H 1/04
11,465,474 B2 * 10/2022 Schollhammer ......... B60J 7/068

* cited by examiner

*Primary Examiner* — Amy R Weisberg
*Assistant Examiner* — Daniel R Digiovannantonio
(74) *Attorney, Agent, or Firm* — SHOOK, HARDY & BACON L.L.P.

(57) ABSTRACT

An enclosure system for a cargo truck can include one or more multi-purpose rails (e.g., top rail and/or bottom rail) to which components of the enclosure system (e.g., walls/curtains, cargo-securing accessories, etc.) can slidably attach. The enclosure system may include a frame that can attach to the flatbed, and the frame can include one or more multi-purpose rails that extend from one part of the enclosure to another part of the enclosure. The multi-purpose rails can include one or more channels, which can connect to components of the enclosure system and allow those components to be selectively secured in place or slid to another location within the enclosure system. The one or more channels can be configured to slidably receive an end of a support post and/or cargo securement components, which can be slid along the channels, from one part of the enclosure system to another part of the enclosure.

20 Claims, 9 Drawing Sheets

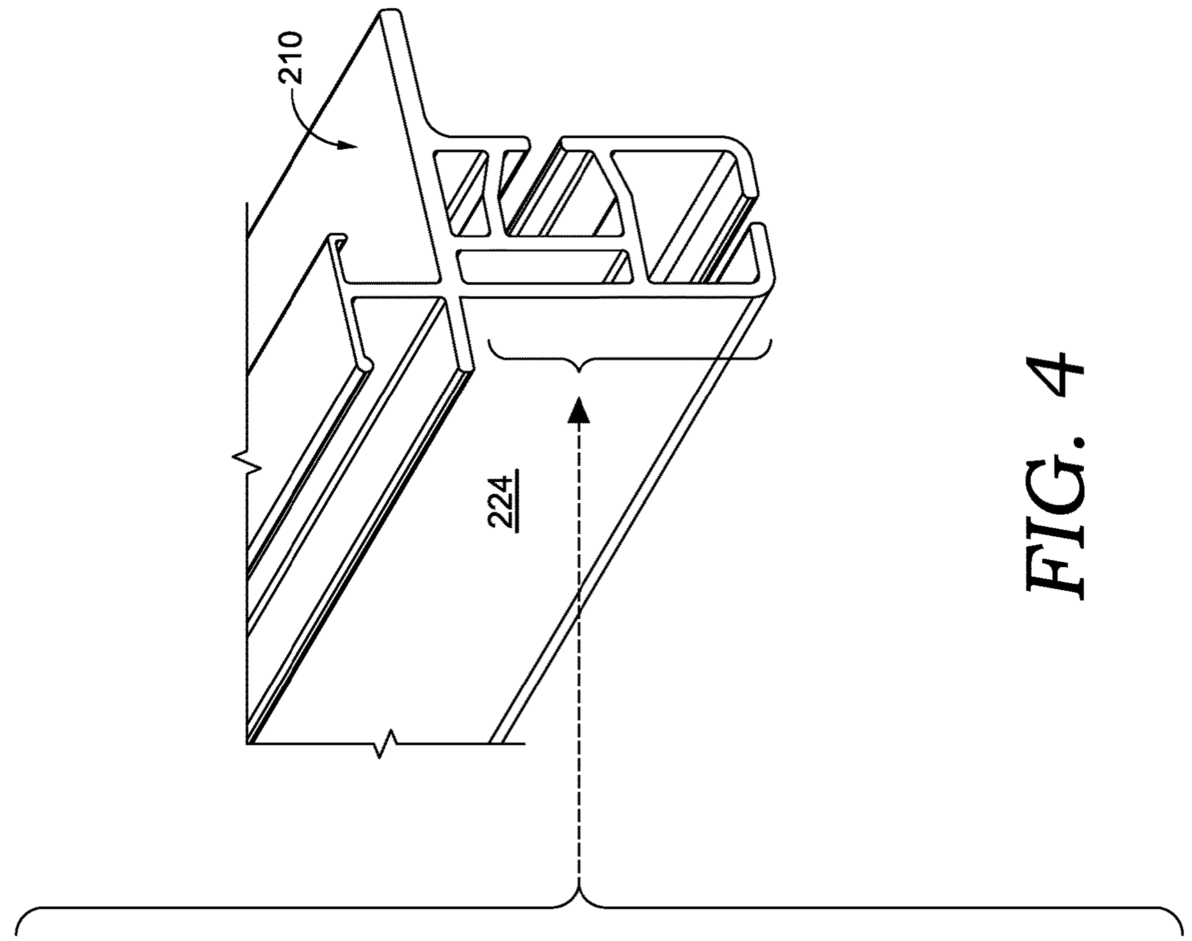
210
224
FIG. 4
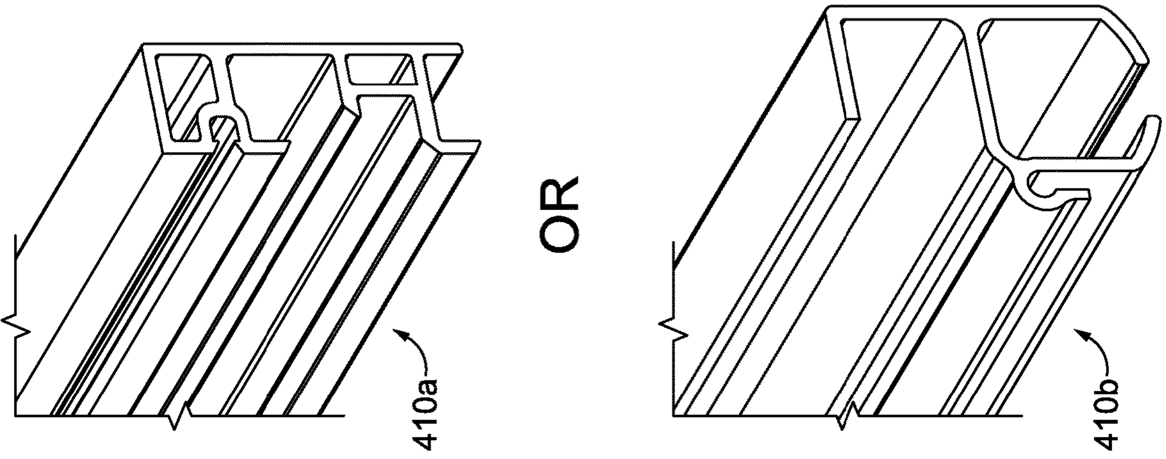
OR
410a
410b

CARGO-TRUCK ENCLOSURE SYSTEM

CROSS-REFERENCE TO RELATED APPLICATIONS

This application claims the benefit of U.S. Provisional Application No. 63/453,347 (filed Mar. 20, 2023). The aforementioned application is hereby incorporated by reference in its entirety.

BACKGROUND

Trucks for transporting cargo often have a flatbed construction in the rear for supporting and securing the cargo. Sometimes, an enclosure is attached to the flatbed to cover and protect the cargo. For example, a frame can be attached to the flatbed, including posts, rails, and/or beams, and the frame can support walls and a roof for covering and protection. Some enclosures can include doors or walls (e.g., on the back and/or on the sides) that lift, raise, or slide to allow the cargo to be loaded, unloaded, or otherwise accessed. For example, in a curtain-side solution, an enclosure for a flatbed can include a wall (e.g., curtain) on the side of the flatbed that slides and/or rolls open. In some examples, the side wall can be affixed to one or more rails (e.g., on the top and/or bottom) to support the side wall and to allow the side wall to move open and/or closed.

DETAILED DESCRIPTION OF DRAWINGS

The present systems and methods for an enclosure system for a cargo truck are described in detail below with reference to these figures.

FIG. 4 depicts the multi-channel rail of FIGS. 2A and 2B and various other rails that mount to a surface of the multi-channel rail, in accordance with examples of this disclosure.

DETAILED DESCRIPTION

Figure 1:
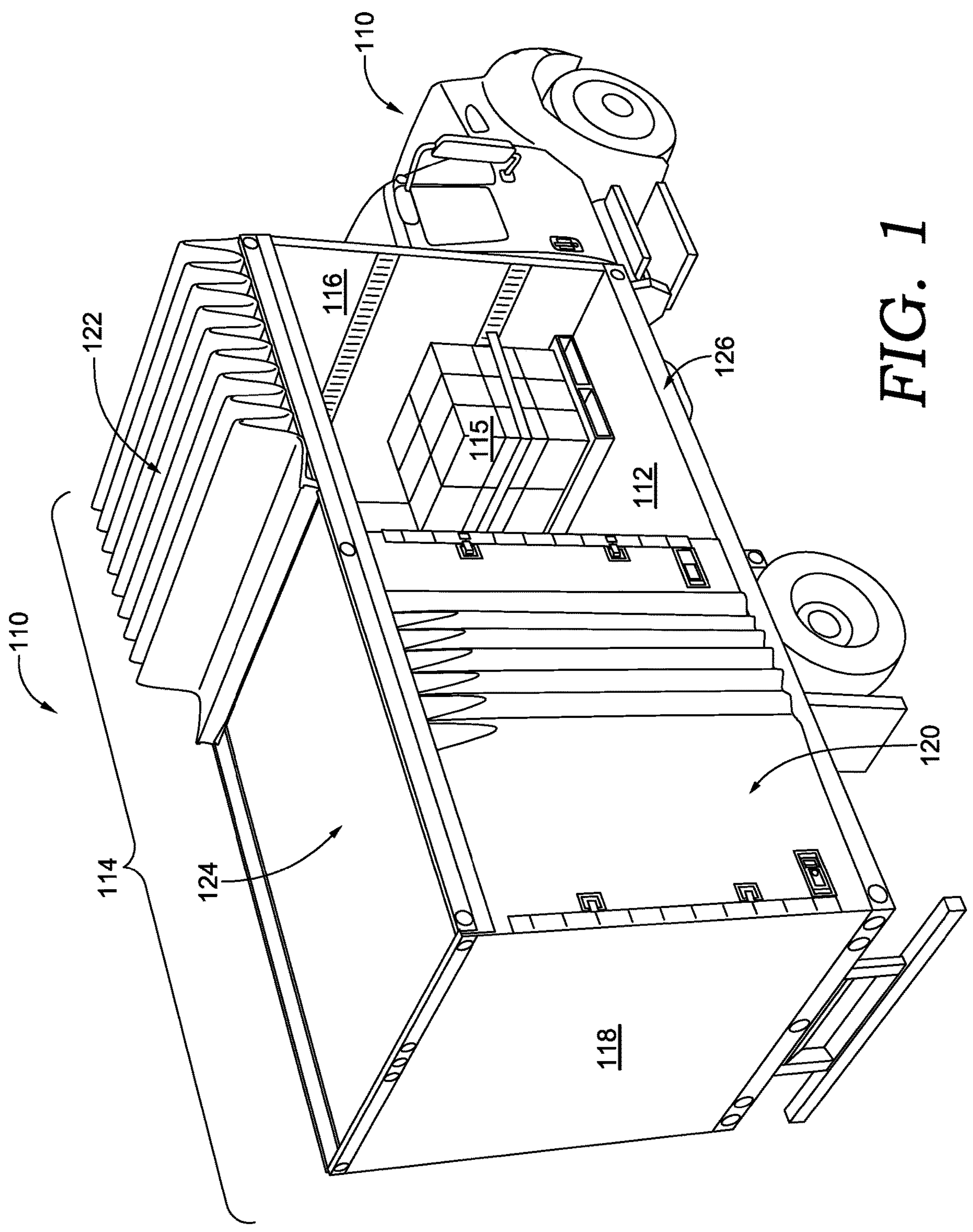
FIG. 1 depicts a truck for transporting cargo and having an enclosure system, in accordance with examples of this disclosure.

This detailed description is related to an enclosure system for a cargo truck, including one or more multi-purpose rails (e.g., top rail and/or bottom rail) to which components of the enclosure system (e.g., walls/curtains, cargo-securing accessories, etc.) can slidably attach. For example, the cargo truck can include a flatbed construction in the rear for supporting and securing cargo. In at least some examples, the enclosure system includes a frame that can attach to the flatbed, and the frame can include posts, rails, and/or beams. Among other things, the frame can support walls and a roof for covering and protecting the cargo. In at least some examples of the present disclosure, the frame can include one or more multi-purpose rails that extend from one part of the enclosure to another part of the enclosure (e.g., from the front of the enclosure system to the back of the enclosure system). In examples, the multi-purpose rails can include one or more channels, which can connect to components of the enclosure system and allow those components to be selectively secured in place or slid to another location within the enclosure system.

In at least some examples, a multi-purpose rail can include a top rail that is secured at an upper part of the enclosure system. In addition, the top rail can extend along a side of the enclosure system and/or across the back of the enclosure system and can support a side wall, such as a curtain. In at least some examples of the present disclosure, the top rail can include multiple channels, which can connect to components of the enclosure system and allow those components to be selectively secured in place or slid to another location within the enclosure system. For example, the top rail can include a first channel that attaches to a support post or support pillar of the frame. That is, the first channel can be configured to slidably receive a top end of the support post, such that the top rail is supported atop the support post. In some examples, the top rail can include a second channel, to which cargo securement components can be anchored. In addition, the second channel can be configured, such that the cargo securement components can be slid along the channel, from one part of the enclosure system to another part of the enclosure, to adjust to the size and location of the cargo.

In examples, this multi-channel construction provides advantages over conventional rails, in which multiple discrete rails and tracks might be provided for each component. That is, examples associated with this present disclosure can provide a single, multi-channel rail, as opposed to requiring multiple rails that must be separately installed, aligned, positioned, and adjusted. Having multiple discrete rails and tracks requires separate connections between them, which can increase the complexity of assembly, integration, and maintenance. Further, discrete rails and tracks can lead to a higher likelihood of failure, as each discrete rail and track introduces a potential point of failure and potential for incorrect installation. For example, the durability of a product might be compromised if connections between the rails and tracks are weakened over time. Additionally, or alternatively, ensuring compatibility and efficient communication between the discrete rails and tracks can be challenging. In contrast to conventional rails with multiple discrete rails and tracks, the multi-channel construction of the enclosure system is easier to install and maintain and eliminates failure points associated with connections between separate rails.

In at least some examples, a multi-channel top rail can include a mounting face for securely mounting to a variety of other top rails. That is, in some examples, it can be useful to include the multi-channel top rail as a component within an enclosure system, which can include other rails for supporting other components of the enclosure system. Examples of the present disclosure can include the multi-channel top rail having a wall or face configured to mount with a variety of other rails. For example, another type rail can include a top rail for slidably supporting a side wall of the enclosure system, such as a curtain that slides to allow cargo to be loaded, unloaded, and/or otherwise accessed. In examples, a face of the multi-channel top rail can provide a large mounting surface for selectively fitting with, and mounting to, a variety of different other top rails.

In at least some examples, the present disclosure can include a securement system for retaining cargo in position within the enclosure system and/or relative to the flatbed. For example, the securement system can include a rail that can extend along a portion of the flatbed (e.g., along a side and/or across a back) and that can selectively receive a portion of a cargo strap. In at least some examples of the present disclosure, the cargo strap can include a webbing portion that connects to a hook, and the hook can mate within a channel of the rail. In some instances, the hook (e.g., J-hook) can include a point on a first side of the hook (e.g., on a front side of the hook), the point being configured to engage the channel. The hook can also include a catch feature on a second side of the hook (e.g., on a back side of the hook) to reduce the likelihood of the hook being inadvertently dislodged from the channel. In at least some examples, the hook can be slid along the channel to selectively position the securement strap relative to the cargo.

FIG. 1 depicts an example vehicle 110 with a flatbed assembly 112. In addition, an enclosure system 114 can be secured to the vehicle 110 and/or to the flatbed assembly 112, and the enclosure system 114 can help to contain, protect, and secure a cargo area 115. Enclosure system 114 can include a frame (e.g., support posts, beams, and rails) that support walls and a roof. For example, the enclosure system 114 can include a front wall 116 (e.g., front bulkhead wall) and a rear wall 118 (e.g., gate, door, panel, or curtain), which can (in some examples) raise, lift, or otherwise move to allow access to the cargo area 115. The enclosure system 114 can also include one or more side walls 120 and a roof 122. In some examples, the side wall 120 can be moved (e.g., slid, rolled, collapsed/expanded, etc.) between a closed state and an open state, which can permit selective and controlled access to the cargo area 115. In some examples, the roof 122 can be moved (e.g., slid, rolled, collapsed/expanded, etc.) between a closed state and an open state, which can permit selective and controlled access to the cargo area 115.

Examples of the present disclosure are related to one or more multi-purpose rails to which components of the enclosure system (e.g., walls/curtains, cargo-securing accessories, etc.) can slidably attach. In at least some examples of the present disclosure, the one or more multi-purpose rails extend from one part of the enclosure system to another part of the enclosure system (e.g., from a front of the enclosure system 114 towards the back of the enclosure system 114 and/or from one side of the enclosure system 114 towards the opposite side of the enclosure system 114).

For example, a multi-purpose rail can extend along an upper region 124 of the enclosure system 114 (e.g., from the front wall 116 to the rear wall 118). In some instances, a multi-purpose rail can extend along a lower region 126 of the enclosure system. One or more multi-purpose rails can extend along the upper region 124 and/or the lower region 126 of the enclosure system 114.

Figure 2A:
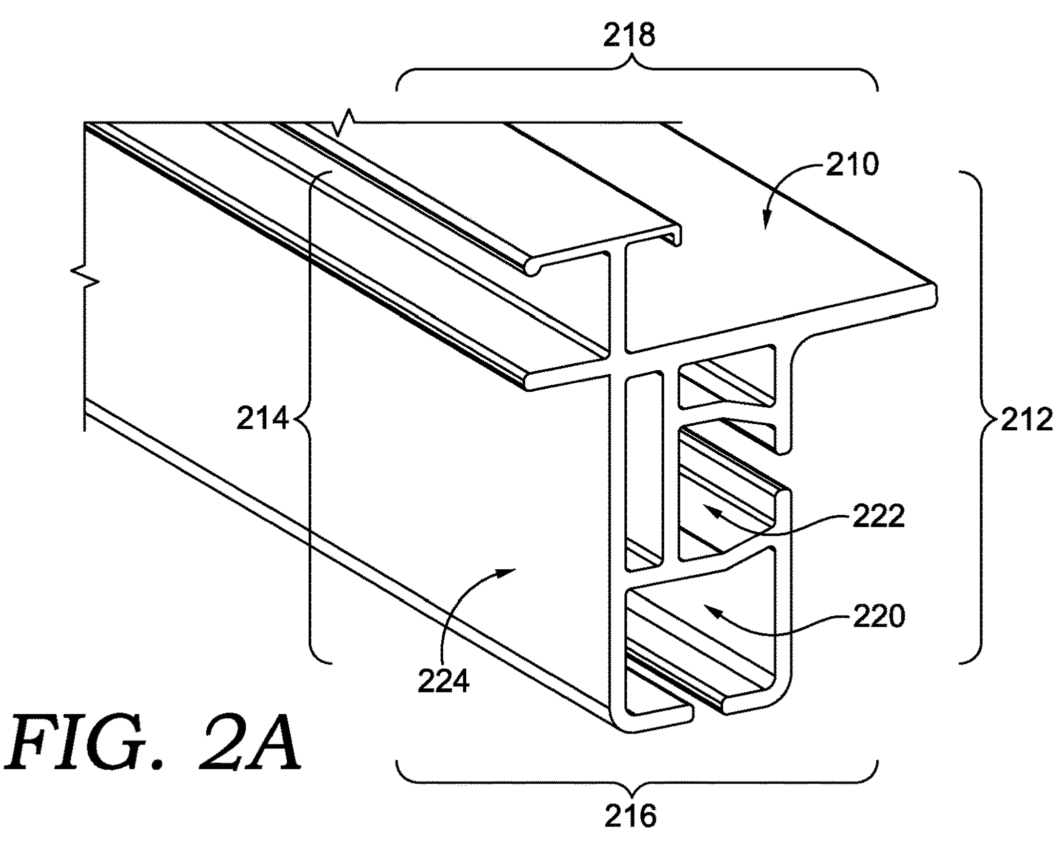
FIG. 2A depicts an example multi-channel rail, in accordance with examples of this disclosure.
Figure 2B:
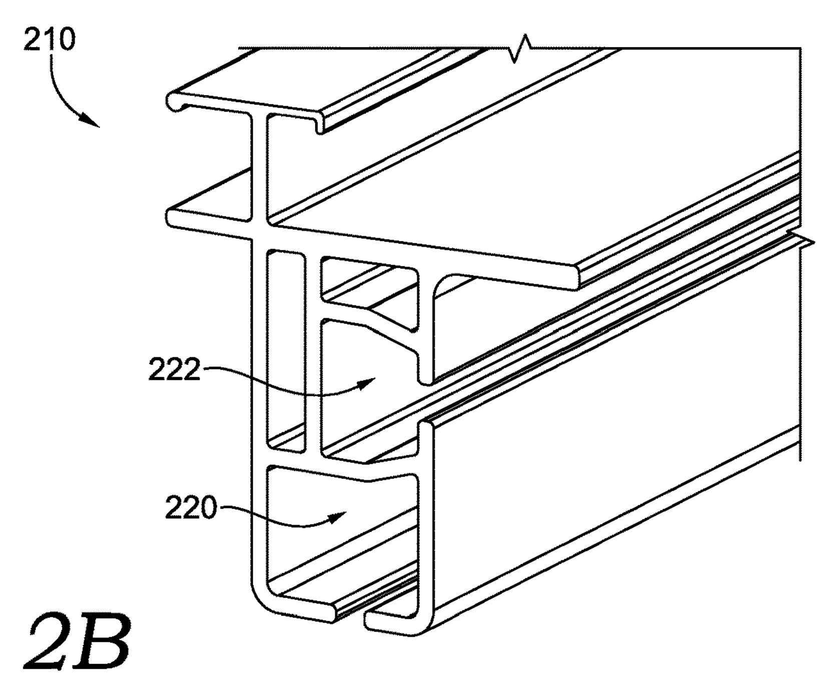
FIG. 2B depicts a slightly different perspective of the example multi-channel rail, in accordance with examples of this disclosure.

Referring to FIGS. 2A and 2B, an example of a multi-purpose rail 210 is depicted. In some examples, the multi-purpose rail 210 can be positioned along the upper region 124 of the enclosure system 114. The multi-purpose rail 210 includes an inner side 212 configured to face towards the cargo area 115, an outer side 214 configured to face away from the cargo area 115, a bottom side 216, and a top side 218. These are meant for general orientation and not necessarily precise delineation. One or more multi-purpose rails can be positioned parallel to one another along the upper region 124 of the enclosure system 114.

In examples, the multi-purpose rail 210 can include a plurality of channels, which can connect to components of the enclosure system and allow those components to be selectively secured in place or slid to another location within the enclosure system. For example, the multi-purpose rail 210 can include a first channel 220 that extends along the bottom side 216 of the rail 210. In at least some examples, the first channel 220 is configured to connect with a portion of a support post or support pillar (e.g., a beam, rail, pole, shaft, etc.). For example, referring briefly to FIG. 3A, the rail 210 is illustrated and a top end of the support post 310 is slidably coupled in the first channel 220 (via the illustrated rollers on the end of the post 310). In examples, rollers are positioned at the end of post 310 to traverse the channel 220, but any suitable means of traversing the channel 220 can be used (e.g., rollers, gliders/sliders, linear bearings, and/or magnetic levitation).

In some examples, the rail 210 can include a second channel 222 that extends along the inner side 212 of the rail 210. In some instances, the second channel 222 can be configured, such that cargo securement components can be slid along the second channel 222, from one part of the enclosure system to another part of the enclosure. For example, the cargo securement components can include a strap and/or tie-down system that attaches to an anchor near the rail 210, and the anchor can be secured within, and slide along (e.g., via rollers, gliders/sliders, linear bearings, and/or magnetic levitation), the second channel 222.

Figure 3A:
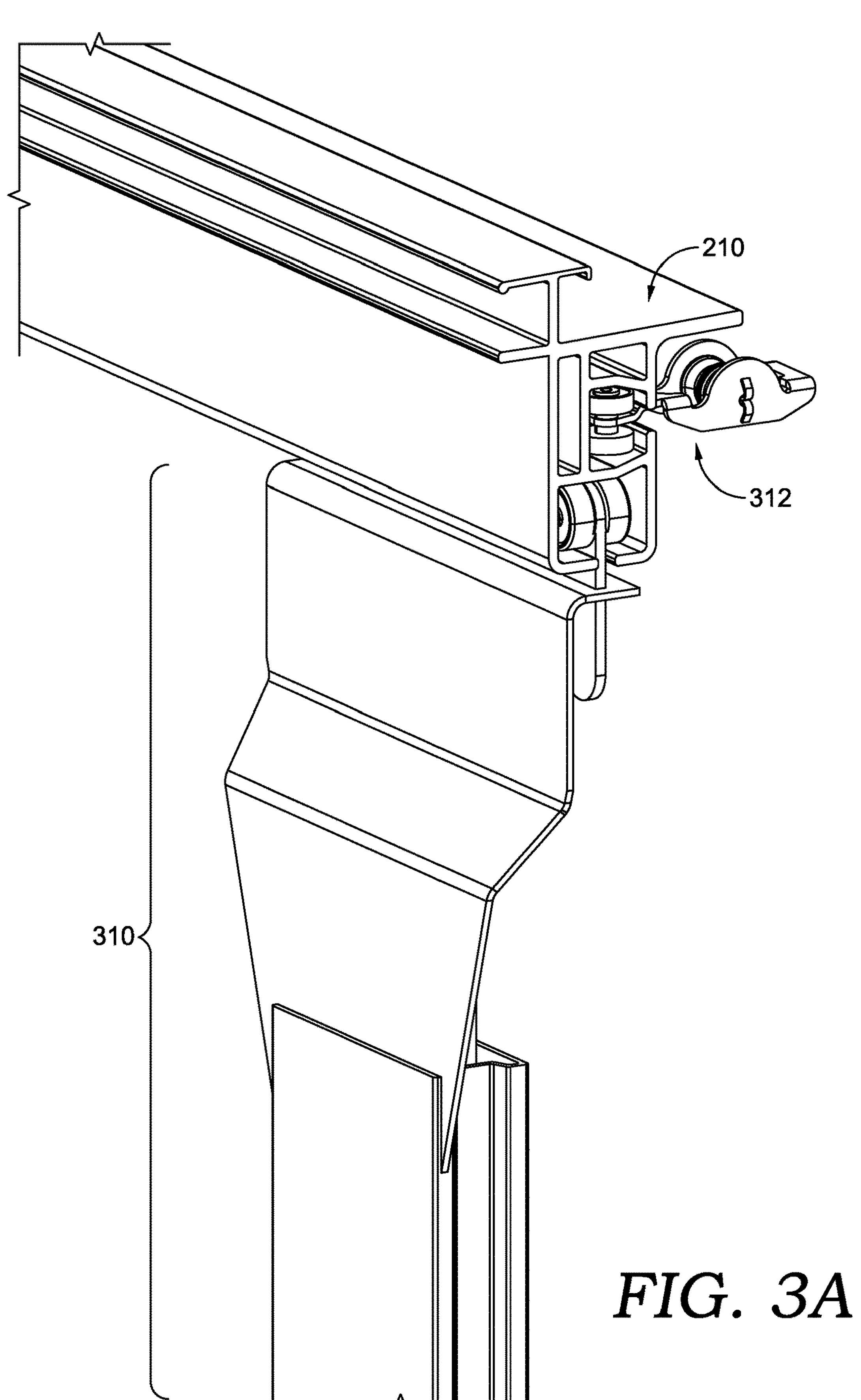
FIG. 3A depicts the multi-channel rail of FIGS. 2A and 2B connected with components of an enclosure system, in accordance with examples of this disclosure.
Figure 3B:
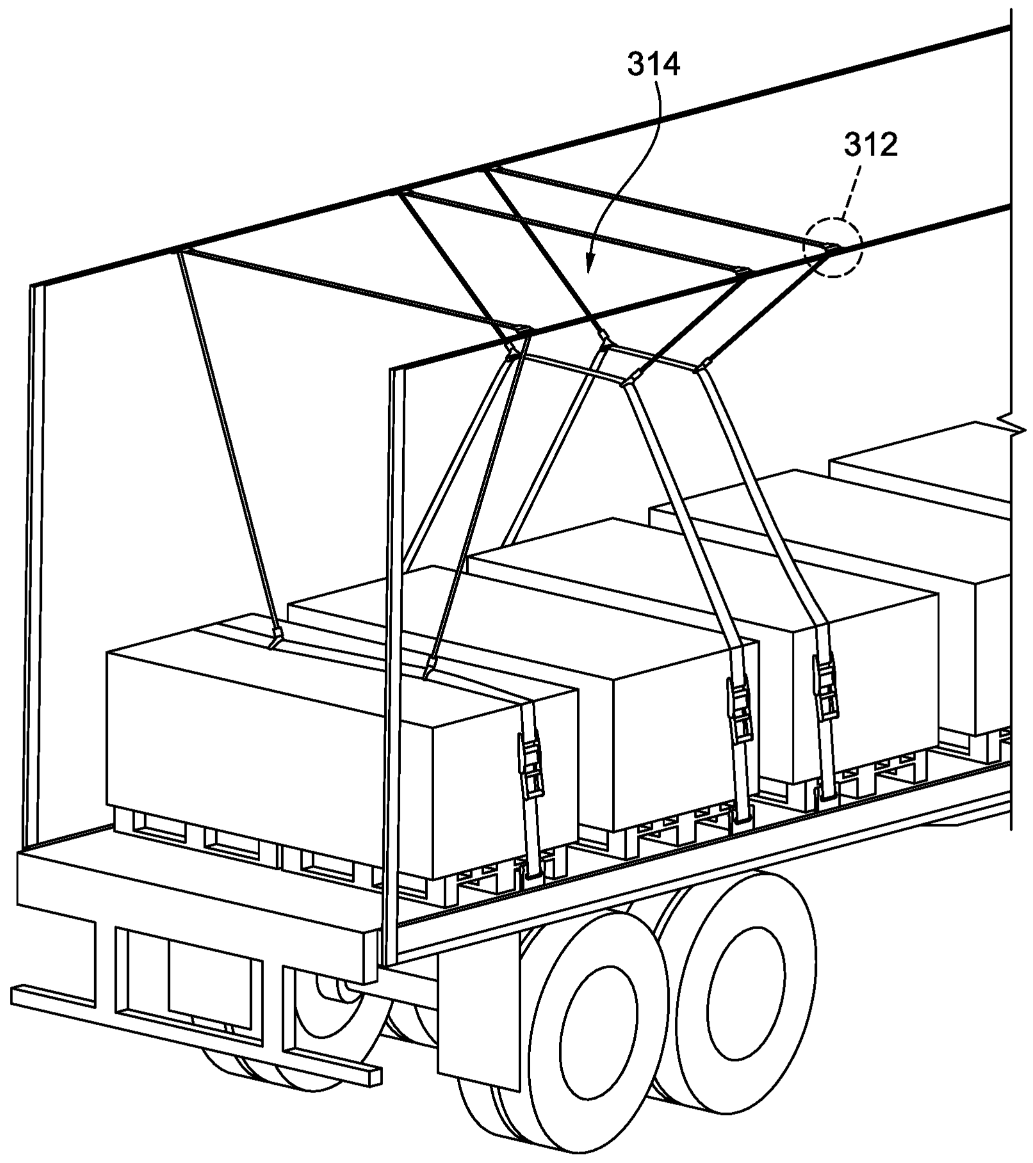
FIG. 3B depicts an example cargo securement system and an example anchor location related to FIG. 3A, in accordance with examples of this disclosure.

Referring briefly to FIG. 3A, an example of an anchor 312 is depicted and the anchor 312 is slidably secured in the channel 222 (e.g., via a roller, as illustrated in FIG. 3A). As such, a strap or tie down can be secured to the anchor 312 and slid along the channel 222 to adjust a fore-aft position (e.g., to align and position with respect to the cargo). In at least some examples, the cargo securement components can include at least some components of the Kaptive Strap™ system sold by Kinedyne, such as the system 314 depicted in FIG. 3B, which also illustrates an example of where the anchor 312 might be positioned. This is just one example, but any type of cargo securement component that can be secured to the anchor 312 and slid along the channel 222 to adjust a fore-aft position can be used.

In examples, this multi-channel rail 210 provides advantages over conventional rails, in which multiple discrete rails and tracks might be provided for each component. That is, examples associated with this present disclosure can provide a single, multi-channel rail, as opposed to requiring multiple rails that must be separately installed, aligned, positioned, and adjusted. Having multiple discrete rails and tracks requires separate connections between them, which can increase the complexity of assembly, integration, and maintenance. Further, discrete rails and tracks can lead to a higher likelihood of failure, as each discrete rail and track introduces a potential point of failure and potential for incorrect installation. For example, the durability of a product might be compromised if connections between the rails and tracks are weakened over time. Additionally, or alternatively, ensuring compatibility and efficient communication between the discrete rails and tracks can be challenging. In contrast to conventional rails with multiple discrete rails and tracks, the multi-channel construction of the enclosure system is easier to install and maintain and eliminates failure points associated with connections between separate rails.

In at least some examples, the rail 210 can include a mounting face 224 for securely mounting to a variety of other top rails. That is, in some examples, it can be useful to include the multi-channel rail 210 as a component within an enclosure system, which can include other rails for supporting other components of the enclosure system. As such, in examples, the rail 210 includes the mounting face 224 configured to mount with a variety of other rails. The mounting face 224 can be arranged in a variety of positions, relative to the other parts of the rail. In at least one example, the mounting face 224 is on the outer side 214 of the rail 210. In addition, the mounting face 224 can include a relatively large, flat, and broad area that provides a customizable attachment zone for the other rail.

The mounting face 224 can attach to various other rails. For example, referring briefly to FIG. 4, other examples of rails 410*a* and 410*b* that can be mounted (e.g., riveted, bolted, or otherwise fastened) to the mounting surface 224 are illustrated. The other rails 410*a* and 410*b* can include a top rail for slidably supporting a side wall of the enclosure system, such as a curtain that slides to allow cargo to be loaded, unloaded, and/or otherwise accessed. The other rails 410*a* and 410*b* are examples, and any other rail that can be mounted to the mounting surface 224 can be used.

Figure 5:
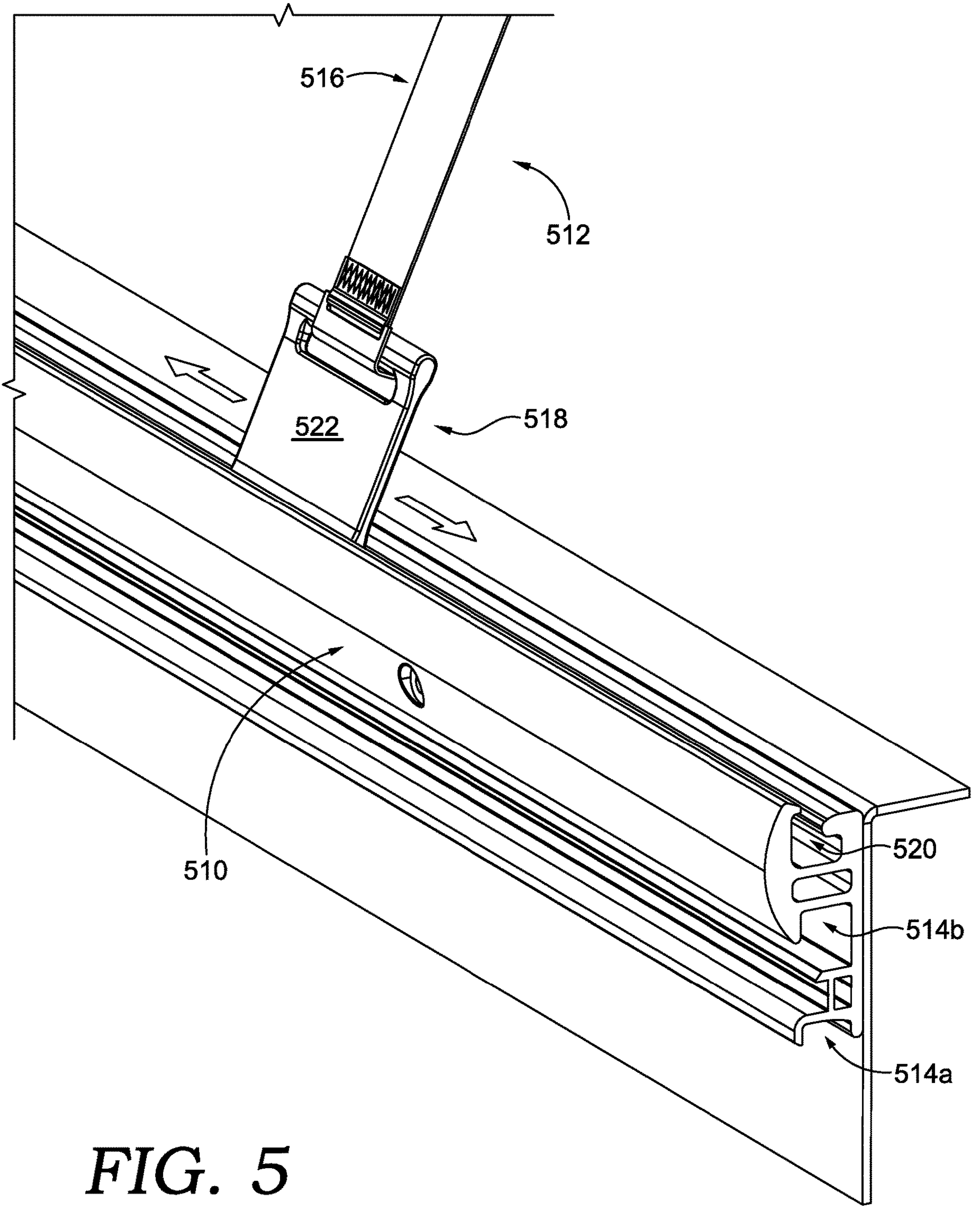
FIG. 5 depicts another rail that can mate with a hook of a securement strap, in accordance with examples of this disclosure.

In at least some examples, the present disclosure can include a securement system for retaining cargo in position within the enclosure system and/or relative to the flatbed (e.g., such as the Kaptive Strap™ system sold by Kinedyne). For example, referring to FIG. 5, a rail 510 that can extend along a portion of a flatbed or along a portion of an enclosure system (e.g., along a side and/or across a back) and that can selectively receive a portion of a cargo strap 512. In some instances, the rail 510 can extend near a lower region 126 (e.g., see FIG. 1) of the cargo area 115 and can extend near a periphery of the flatbed assembly 112 (e.g. along a side of the flatbed). In at least some examples, one or more rails can be positioned parallel to one another along the lower region 126 of the enclosure system 114.

In at least some examples, the rail 510 can include one or more channels 514*a* and 514*b* for connecting to a portion of a side wall of an enclosure system. For example, the lower end of a curtain (e.g., of a curtain side enclosure system) can mate in one or more of the channels 514*a* and/or 514*b* (e.g., via one or more rollers or other hardware configured to secure the curtain). In some examples, the channels 514*a* and/or 514*b* may allow for a curtain to selectively slide or otherwise move along the rail 510 to allow access to the cargo area 115.

In some examples, the rail 510 can omit one or more of the channels 514*a* and/or 514*b*. For example, the rail 510 can be positioned along a flatbed that does not include an enclosure system. However, in at least some examples, the rail 510 may still include a channel 520 without including channels 514*a* and/or 514*b*.

Figure 6:
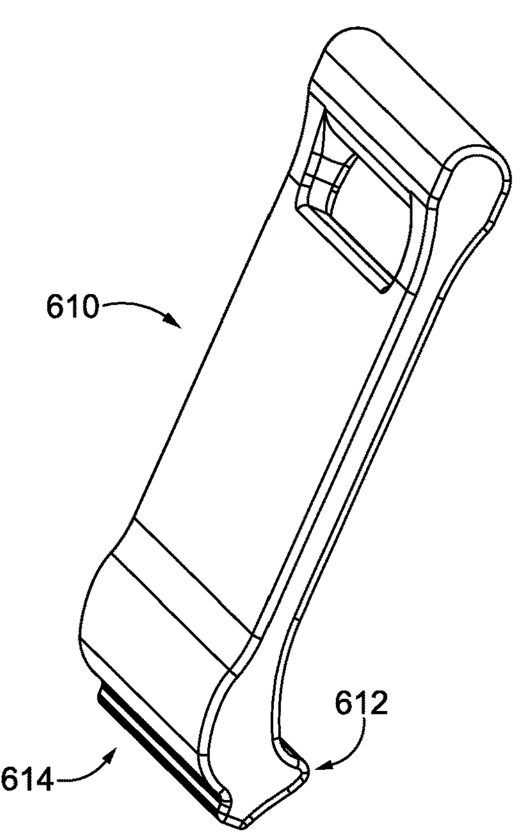
FIG. 6 depicts a hook that can mate in a channel of a rail and that includes a protuberance for impeding dislodgement from the channel, in accordance with examples of this disclosure.
Figure 6:
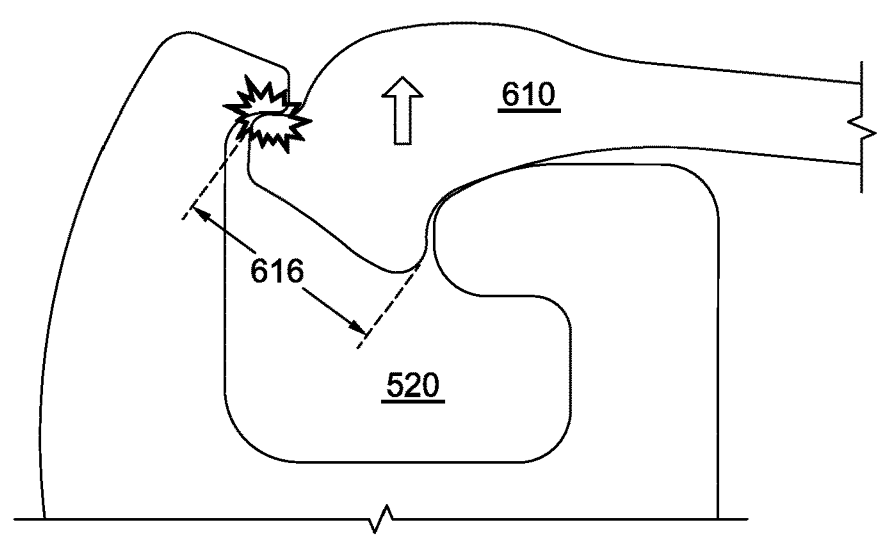
Figure 7:
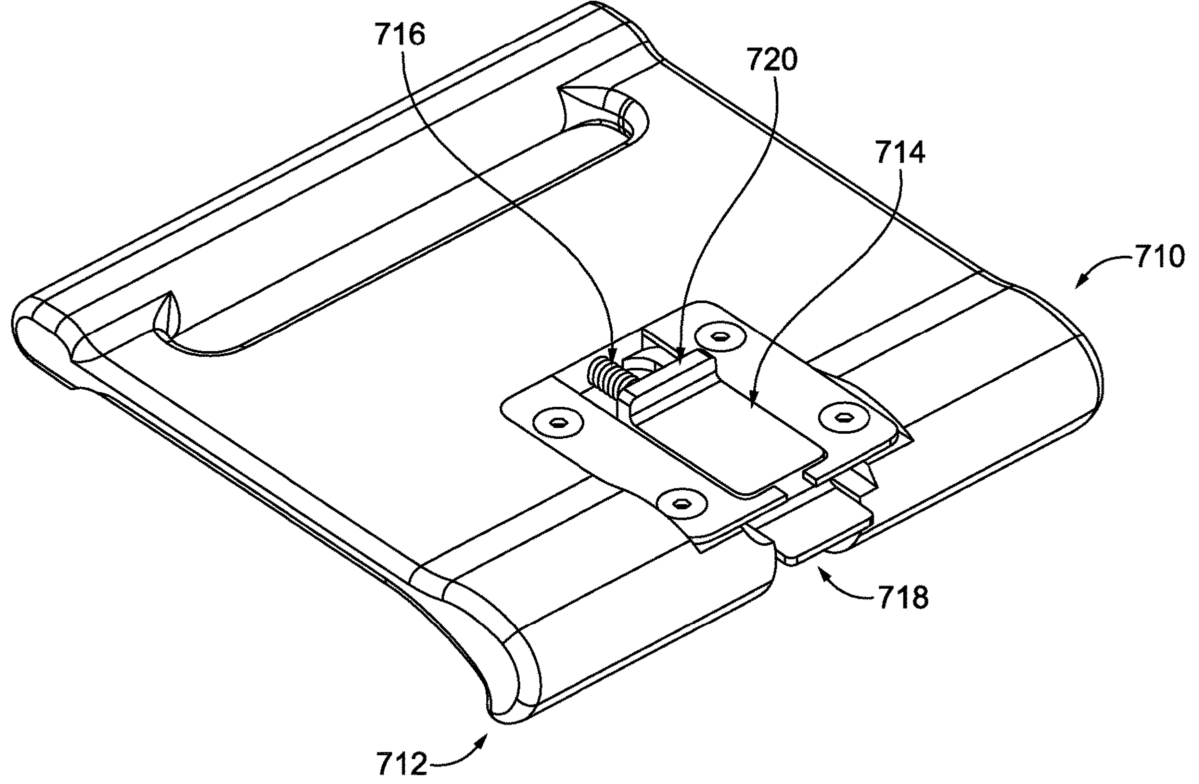
FIG. 7 depicts another hook that can mate in a channel of a rail and that includes a spring-loaded latch with a compression spring for impeding dislodgement from the channel, in accordance with examples of this disclosure.
Figure 8:
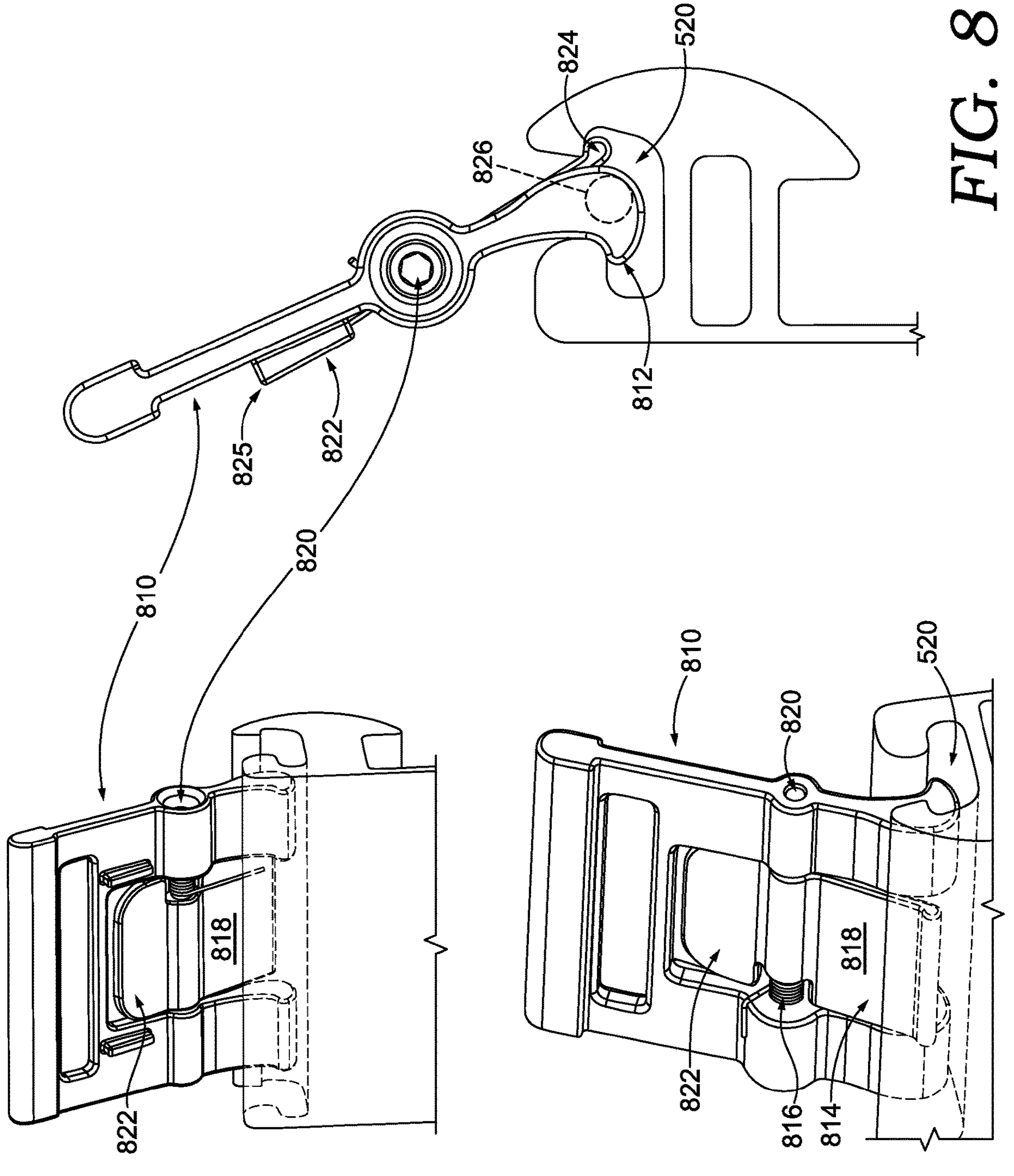
FIG. 8 depicts yet another hook that can mate in a channel of a rail and that includes a spring-loaded latch with a torsional spring for impeding dislodgement from the channel, in accordance with examples of this disclosure.

In at least some examples of the present disclosure, the cargo strap 512 can include a webbing portion 516 that connects to a hook 518, and the hook 518 can mate within a channel 520 of the rail 510. The hook 518 can take on several different forms (e.g., as illustrated in FIGS. 6-8). The webbing portion of the cargo strap 512 may be constructed from any suitable material that can secure and/or hold loads in transport, including, but not limited to, polyester (e.g., woven, corded, and/or bonded), nylon, polypropylene, and composite material.

In some examples, when the lower end of the curtain is secured to one or more of the channels 514*a* and/or 514*b*, then for purposes of the securement system, access to the flatbed assembly is blocked. That is, when the curtain or side wall is not connected to the rail or when the curtain or side wall is omitted, then the cargo strap 512 can be secured to the flatbed assembly (e.g., to a frame of the vehicle or to a side rail or side wall of the flatbed). However, when the curtain or side wall of the enclosure system is attached to the rail 510, then the cargo strap 512 is blocked from extending down to the frame of the flatbed assembly, without an opening in the curtain or side wall or in the flatbed. As such, in some examples of the present disclosure, the channel 520 is positioned internal to the curtain or side of the enclosure assembly, such that when the curtain or side wall is closed, the strap 512 can still be secured to the channel 520, which is effectively inside the cargo area 115.

In some examples, it can still be desirable to secure the strap 512 to the channel 520, even if there is no enclosure system. For example, the strap 512, when secured to channel 520, may be used to secure cargo within the cargo area 115. In order to secure cargo within the cargo area 115, the strap 512 is secured to channel 510 via hook 518.

In some instances, the hook 518 (e.g., J-hook) can include a point on a first side of the hook 518 (e.g., on a front side of the hook), the point being configured to engage the channel 520. The hook 518 can also include a catch feature on a second side of the hook (e.g., on a back side of the hook) to reduce the likelihood of the hook being inadvertently dislodged from the channel, and FIGS. 6-8 illustrate various example catch features. In at least some examples, the hook 518 can be slid along the channel 520 (e.g., as indicated by arrows 522) to selectively position the securement strap 512 relative to the cargo.

Referring to FIG. 6, an example hook 610 is depicted, which includes a point 612 on a first side for engaging the channel 520 and includes a catch feature 614 on a second side to reduce the likelihood of the hook being inadvertently dislodged from the channel 520. In some examples, the catch feature 614 can include a protuberance, such as one or more molded-in ribs, that protrude from the second side of the hook 610 and are configured to interfere with the walls of the channel 520 to prevent dislodging. In at least some examples, the hook 610 is configured such that a distance 616 between a tip of the point 612 and a tip of the catch feature 614 is larger than the mouth of the channel 520 (e.g., allowing the hook to be secured in the mouth of channel 520). In at least some examples, a position of the hook 610 can be adjusted by sliding the hook 610 within the channel 520. In some examples, the hook 610 can be positioned into (or removed from) the channel 520 by sliding the hook 610 through an end of the channel 520.

Referring to FIG. 7, an example hook 710 is depicted, which includes a point 712 on a first side for engaging the channel 520 and includes a catch feature 714 on a second side to reduce the likelihood of the hook 710 being inadvertently dislodged from the channel 520. In some examples, the catch feature 714 can include a spring-loaded latch. For example, the spring-loaded latch can include a compression spring 716 that pushes a bolt 718 outward, away from the hook 710. That is, the bolt 718 can slidably reciprocate in and out with respect to the hook body. As such, when the hook 710 is engaged in the channel 520, the bolt prevents the hook 710 from being dislodged. To remove the hook 710, the bolt 718 can be retracted by pulling back on the spring (e.g., via the lip 720). In examples, the hook 710 can (e.g., similar to the hook 610), be slid along the channel 520 to adjust a position of the hook 710 relative to cargo.

Referring to FIG. 8, an example hook 810 is depicted, which includes a point 812 on a first side for engaging the channel 520 and includes a catch feature 814 on a second side to reduce the likelihood of the hook 810 being inadvertently dislodged from the channel 520. In some examples, the catch feature 814 can include a spring-loaded latch. For example, the spring-loaded latch can include a torsional spring 816 and a lever 818 that is rotationally coupled to the hook 810. In examples, the lever 818 can pivot about a pin 820 or other elongate member, such that the lever 818 includes a first end 822 on one side of the pin 820 and second end 824 on the opposing side of the pin 820. In examples, the torsional spring 816 engages the first end 822 and/or the second end 824 to rotationally bias the lever 818 in a first direction, such that the second end 824 is positioned to interfere with the channel 520 and reduce the likelihood of the hook 810 becoming inadvertently dislodged. To modify a position of the second end 824 to no longer interfere with the wall of the channel 520, the first end 822 can be pushed in the direction 825 (as depicted by the arrow) opposite the force of the torsional spring 816 to rotate the lever 818 on the pin 820 and move the second end 824 to a position 826 that aligns with the head of the hook 818. With the second end 824 rotated to no longer interfere with the channel wall, the hook 810 can be removed from the channel 520. In examples, the hook 810 can (e.g., similar to the hook 610), be slid along the channel 520 to adjust a position of the hook 810 relative to cargo.

In examples, a hook (e.g., 518, 610, 710, and/or 810) with a protrusion or other features for secure retention within a recess (e.g., channel, slot, aperture, etc.) can be secured to a variety of different structures associated with a flatbed. For example, the hook can be secured to the flatbed itself (e.g., a flatbed without an enclosure) or to a part of the enclosure assembly (e.g., to a rail associated with the enclosure assembly).

EXAMPLE CLAUSES

A. An enclosure system for a vehicle having a flatbed assembly, the enclosure system comprising: a frame configured to attach to the flatbed assembly; one or more side walls supported by the frame and configured to at least partially enclose a cargo space; a multi-channel rail comprising: an inner side to face towards the cargo space, an outer side to face away from the cargo space, and a bottom side; a first channel extending along the bottom side and configured to slidably receive a top end of a support post; a second channel extending along the inner side and configured to slidably receive an anchor of a first cargo securement assembly; and a mounting surface on the outer side configured to connect to one or more different top rails configured to slidably support a side wall of the one or more side walls.

B. The enclosure system of Clause A, wherein the support post is slidably coupled to the first channel by at least one roller.

C. The enclosure system of Clauses A and B, wherein the first cargo securement component comprises a strap system that attaches to the anchor.

D. The enclosure system of Clauses A and B, wherein the anchor is slidably coupled to the second channel.

E. The enclosure system of Clauses A-D, wherein the side wall of the one or more side walls is a slidable curtain.

F. The enclosure system of Clauses A-E, a second multi-channel rail comprising: a third channel configured to receive a second anchor associated with a second cargo securement system; and a fourth channel configured to slidably receive a lower portion of a side wall of the enclosure system.

G. The enclosure system of Clauses A-F, wherein the second anchor is a hook and the first channel is configured to slidably receive the hook.

H. The enclosure system of Clauses A-G, wherein the hook comprises a point to engage an inner lip of the third channel and a catch configured to impede the hook from disengaging from the third channel.

I. The enclosure system of Clauses A-H, wherein the catch is a protruding rib.

J. The enclosure system of Clauses A-I, wherein the catch is a spring-loaded latch.

K. A universal, multi-channel top rail for a cargo-enclosure system, the top rail comprising: a first side, a second side that is opposite the first side, a top side, and a bottom side; the bottom side comprising a first channel configured to slidably receive a top end of a support post; the first side comprising a second channel configured to slidably receive an anchor of a cargo securement assembly: the outer side comprising a mounting surface configured to independently connect to a plurality of different top rails.

L. The universal, multi-channel top rail of Clause K, wherein the first channel is configured to receive a first roller assembly.

M. The universal, multi-channel top rail of Clauses K and L, wherein the cargo securement component comprises a strap system that attaches to the anchor.

N. The universal, multi-channel top rail of Clauses K-M, wherein the cargo securement component comprises a tie-down system that attaches to the anchor.

O. The universal, multi-channel top rail of Clauses K-N, wherein the anchor is slidably coupled to the second channel.

P. The universal, multi-channel top rail of Clauses K-O, wherein the anchor is slidably coupled to the second channel by at least one roller.

Q. The universal, multi-channel top rail of Clauses K-P, wherein the side wall of the one or more side walls is a slidable curtain.

R. The universal, multi-channel top rail of Clauses K-Q, wherein the mounting surface spans the first channel and the second channel.

S. A top-rail kit for a cargo-enclosure assembly, the top-rail kit comprising: a universal, multi-channel top rail comprising: a first side, a second side that is opposite the first side, a top side, and a bottom side; the bottom side comprising a first channel configured to slidably receive a top end of a support post; the first side comprising a second channel configured to slidably receive an anchor of a cargo securement assembly; and the second side comprising a mounting surface configured to be selectively mounted to either a first top rail or a second top rail; the first top rail being removably attachable to the second side and comprising a third channel configured to attach to a first side wall; and the second top rail being removably attachable to the second side and comprising a fourth channel configured to attach to a second side wall, which is different from the first side wall.

T. The top-rail kit of Clause S, wherein the support post is slidably coupled to the first channel by at least one roller.

U. An enclosure system for a vehicle having a flatbed assembly, the enclosure system comprising: a rail comprising: a first channel configured to mate with a lower portion of a side wall of the enclosure system; a second channel positioned internal to the side wall when the lower portion of the side wall is mated with the first channel; and a securement strap having a hook configured to engage the second channel, wherein the hook comprises a catch configured to impede the hook from disengaging from the channel.

V. The enclosure system of Clause U, wherein the side wall of the one or more side walls is a slidable curtain and/or wherein the enclosure system comprises a frame configured to attach to the flatbed assembly and one or more side walls supported by the frame and configured to at least partially enclose a cargo space.

W. The enclosure system of Clauses U and V, wherein the hook is slidable along the second channel to selectively position the securement strap along the rail.

X. The enclosure system of Clauses U-W, wherein the securement strap is securable to the second channel when the side wall is closed.

Y. The enclosure system of Clauses U-X, wherein the catch comprises one or more ribs that protrude from a side of the hook.

Z. The enclosure system of Clauses U-Y, wherein the hook comprises a point on a first side for engaging the channel and the catch is on a second side.

AA. The enclosure system of Clauses U-Z, wherein the hook is configured such that a distance between a tip of the point and a tip of the catch is larger than a mouth of the channel feature.

BB. The enclosure system of Clauses U-Y, wherein the catch comprises a spring-loaded latch.

CC. The enclosure system of Clauses U-BB, wherein the spring-loaded latch comprises a compression spring that pushes a bolt away from the hook.

DD. The enclosure system of Clauses U-CC, wherein the bolt is retractable by pulling back on the spring.

EE. The enclosure system of Clauses U-BB, wherein the spring-loaded latch comprises a torsional spring and a lever that pivots about a pin and that is rotationally coupled to the hook.

FF. The enclosure system of Clauses U-EE, wherein the torsional spring engages an end of the lever to rotationally bias the lever in a first direction to engage the channel.

GG. A hook for a cargo-enclosure system, the hook comprising: a first side and a second side; the first side comprising a first end configured to slidably engage a first portion of a channel; the second side comprising a second end configured to engage a second portion of a channel; the second end configured to disengage the second portion of the channel.

HH. The hook of Clause GG, wherein the hook is attached to a securement strap.

II. The hook of Clauses GG and HH, wherein the first end is a point for engaging the first end of the channel.

JJ. The hook of Clauses GG-II, wherein the second end comprises a spring-loaded latch.

KK. The hook of Clauses GG-KK, wherein the spring-loaded latch comprises a compression spring that pushes a bolt away from the hook.

LL. The hook of Clauses GG-KK, wherein the bolt is retractable by pulling back on the spring.

MM. The hook of Clauses GG-MM, wherein the spring-loaded latch comprises a torsional spring and a lever that pivots about a pin and that is rotationally coupled to the hook.

NN. A hook for a cargo-enclosure assembly, the hook comprising: a first side and a second side; the first side comprising a first end configured to slidably engage a first end of a channel; the second side comprising a second end configured to engage a second end of a channel; the second end configured to disengage the second end of the channel.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The present embodiments are described with reference to the drawings in which like elements are referred to by like numerals. The relationship and functioning of the various elements of this disclosure are better understood from the detailed description. However, the embodiments of the disclosure are not limited to the embodiments illustrated in the drawings. It should be understood that in certain instances, details have been omitted which are not necessary for an understanding of the present disclosure, such as conventional fabrication and assembly.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or examples can become apparent to those of ordinary skill in the art to which the present subject matter pertains without departing from the scope hereof.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

What is claimed is:

1. An enclosure system for a vehicle having a flatbed assembly, the enclosure system comprising:

a frame configured to attach to the flatbed assembly;

one or more side walls supported by the frame and configured to at least partially enclose a cargo space;

a multi-channel rail comprising:

an inner side to face towards the cargo space, an outer side to face away from the cargo space, and a bottom side;

a first channel extending along the bottom side and configured to slidably receive a top end of a support post;

a second channel extending along the inner side and configured to slidably receive an anchor of a first cargo securement assembly; and a mounting surface on the outer side configured to connect to one or more different top rails configured to slidably support a side wall of the one or more side walls.

2. The enclosure system of claim 1, wherein the support post is slidably coupled to the first channel by at least one roller.

3. The enclosure system of claim 1, wherein the first cargo securement component comprises a strap system that attaches to the anchor.

4. The enclosure system of claim 1, wherein the anchor is slidably coupled to the second channel.

5. The enclosure system of claim 1, wherein the side wall of the one or more side walls is a slidable curtain.

6. The enclosure system of claim 1 further comprising, a second multi-channel rail comprising:

a third channel configured to receive a second anchor associated with a second cargo securement system; and a fourth channel configured to slidably receive a lower portion of a side wall of the enclosure system.

7. The enclosure system of claim 6, wherein the second anchor is a hook and the first channel is configured to slidably receive the hook.

8. The enclosure system of claim 7, wherein the hook comprises a point to engage an inner lip of the third channel and a catch configured to impede the hook from disengaging from the third channel.

9. The enclosure system of claim 8, wherein the catch is a protruding rib.

10. The enclosure system of claim 8, wherein the catch is a spring-loaded latch.

11. A universal, multi-channel top rail for a cargo-enclosure system, the top rail comprising:

a first side, a second side that is opposite the first side, a top side, and a bottom side;

the bottom side comprising a first channel configured to slidably receive a top end of a support post;

the first side comprising a second channel configured to slidably receive an anchor of a cargo securement assembly;

the outer side comprising a mounting surface configured to independently connect to a plurality of different top rails.

12. The universal, multi-channel top rail of claim 11, wherein the first channel is configured to receive a first roller assembly.

13. The universal, multi-channel top rail of claim 11, wherein the cargo securement component comprises a strap system that attaches to the anchor.

14. The universal, multi-channel top rail of claim 11, wherein the cargo securement component comprises a tie-down system that attaches to the anchor.

15. The universal, multi-channel top rail of claim 11, wherein the anchor is slidably coupled to the second channel.

16. The universal, multi-channel top rail of claim 11, wherein the anchor is slidably coupled to the second channel by at least one roller.

17. The universal, multi-channel top rail of claim 11, wherein the side wall of the one or more side walls is a slidable curtain.

18. The universal, multi-channel top rail of claim 13, wherein the mounting surface spans the first channel and the second channel.

19. A top-rail kit for a cargo-enclosure assembly, the top-rail kit comprising:

a universal, multi-channel top rail comprising:

a first side, a second side that is opposite the first side, a top side, and a bottom side;

the bottom side comprising a first channel configured to slidably receive a top end of a support post;

the first side comprising a second channel configured to slidably receive an anchor of a cargo securement assembly; and the second side comprising a mounting surface configured to be selectively mounted to either a first top rail or a second top rail;

the first top rail being removably attachable to the second side and comprising a third channel configured to attach to a first side wall; and the second top rail being removably attachable to the second side and comprising a fourth channel configured to attach to a second side wall, which is different from the first side wall.

20. The top-rail kit of claim 19, wherein the support post is slidably coupled to the first channel by at least one roller.

* * * * *